US011862423B2

(12) United States Patent
Shiomi

(10) Patent No.: US 11,862,423 B2
(45) Date of Patent: Jan. 2, 2024

(54) RELAY CONTROL CIRCUIT AND POWER SUPPLY CIRCUIT

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/835,335

(22) Filed: Jun. 8, 2022

(65) Prior Publication Data

US 2022/0406543 A1 Dec. 22, 2022

(30) Foreign Application Priority Data

Jun. 22, 2021 (JP) ................................. 2021-103537

(51) Int. Cl.
*H01H 47/32* (2006.01)

(52) U.S. Cl.
CPC .................................. *H01H 47/32* (2013.01)

(58) Field of Classification Search
CPC .................. H01H 47/00; H01H 47/22; H01H 47/223-30; H01H 47/32; H01H 47/325; H01H 47/34; H01H 47/36
USPC ........ 361/139, 143, 152, 153, 154, 160-210
See application file for complete search history.

(56) References Cited

U.S. PATENT DOCUMENTS

2010/0256080 A1 10/2010 Hassiepen et al.
2012/0295860 A1 11/2012 Hassiepen et al.
2014/0211363 A1* 7/2014 Oebser .................. H01H 47/32 361/190
2015/0357141 A1* 12/2015 Chennakesavan ..... H01H 47/32 361/194

FOREIGN PATENT DOCUMENTS

CN 205863093 U * 1/2017
JP S56174818 U 12/1981
JP 2003219314 A 7/2003
JP 2008186645 A 8/2008
JP 2011504903 A 2/2011
JP 2021504903 A 2/2021

OTHER PUBLICATIONS

English translation of JP2008186645. (Year: 2008).*
English translation of CN205863093. (Year: 2017).*

* cited by examiner

*Primary Examiner* — Thienvu V Tran
*Assistant Examiner* — Carlos O Rivera-Perez
(74) *Attorney, Agent, or Firm* — ScienBiziP, P.C.

(57) ABSTRACT

A relay control circuit is configured to control opening and closing of a contact of a non-latch relay that includes the contact and a coil configured to operate the contact. The relay control circuit includes: a low-voltage power supply; a high-voltage power supply; a first transistor; a rectifying element; and a reference voltage node. A high-voltage terminal of the first transistor is connected to a positive electrode of the high-voltage power supply. A low-voltage terminal of the first transistor is connected to one end of the coil. An anode of the rectifying element is connected to a positive electrode of the low-voltage power supply. A cathode of the rectifying element is connected to one end of the coil. A negative electrode of the high-voltage power supply, a negative electrode of the low-voltage power supply, and the other end of the coil are connected to the reference voltage node.

3 Claims, 3 Drawing Sheets

RELAY CONTROL CIRCUIT AND POWER SUPPLY CIRCUIT

CROSS-REFERENCE TO RELATED APPLICATION

The present application claims priority from Japanese Patent Application Number 2021-103537, the content to which is hereby incorporated by reference into this application.

BACKGROUND OF THE INVENTION

1. Field of the Invention

The disclosure below relates to a relay control circuit and a power supply circuit.

2. Description of the Related Art

Relays used in the power supply circuit are also required to have low loss. JP 2003-219314 A discloses a relay control circuit for low loss in the relay.

SUMMARY OF THE INVENTION

However, even with such a relay control circuit, there is still room for loss reduction of the relay. One aspect of the disclosure has an object to provide a relay control circuit capable of further reducing loss of the relay than in the related art.

In order to solve the problem described above, a relay control circuit according to one aspect of the disclosure is a relay control circuit configured to control opening and closing of a contact of a non-latch relay, the non-latch relay including the contact and a coil configured to operate the contact, the relay control circuit including a low-voltage power supply; a high-voltage power supply; a first transistor; a rectifying element; and a reference voltage node, wherein a high-voltage terminal of the first transistor is connected to a positive electrode of the high-voltage power supply, a low-voltage terminal of the first transistor is connected to one end of the coil, an anode of the rectifying element is connected to a positive electrode of the low-voltage power supply, a cathode of the rectifying element is connected to one end of the coil, and a negative electrode of the high-voltage power supply, a negative electrode of the low-voltage power supply, and the other end of the coil are connected to the reference voltage node.

According to one aspect of the disclosure, low loss of the relay is possible as compared to the related art.

DETAILED DESCRIPTION OF THE INVENTION

A relay including a contact functioning as a switch (switching part) is used in a power supply circuit. The relay control circuit opens and closes the contact by applying a voltage across the coil provided in the relay.

A non-latch relay used in the power supply circuit needs to continuously apply a voltage across the coil in order to hold a contact state (for example, pickup) during operation. A relay control circuit 10 of the disclosure reduces the loss of a relay RL1 by reducing the voltage to hold the pickup.

Figure 1:
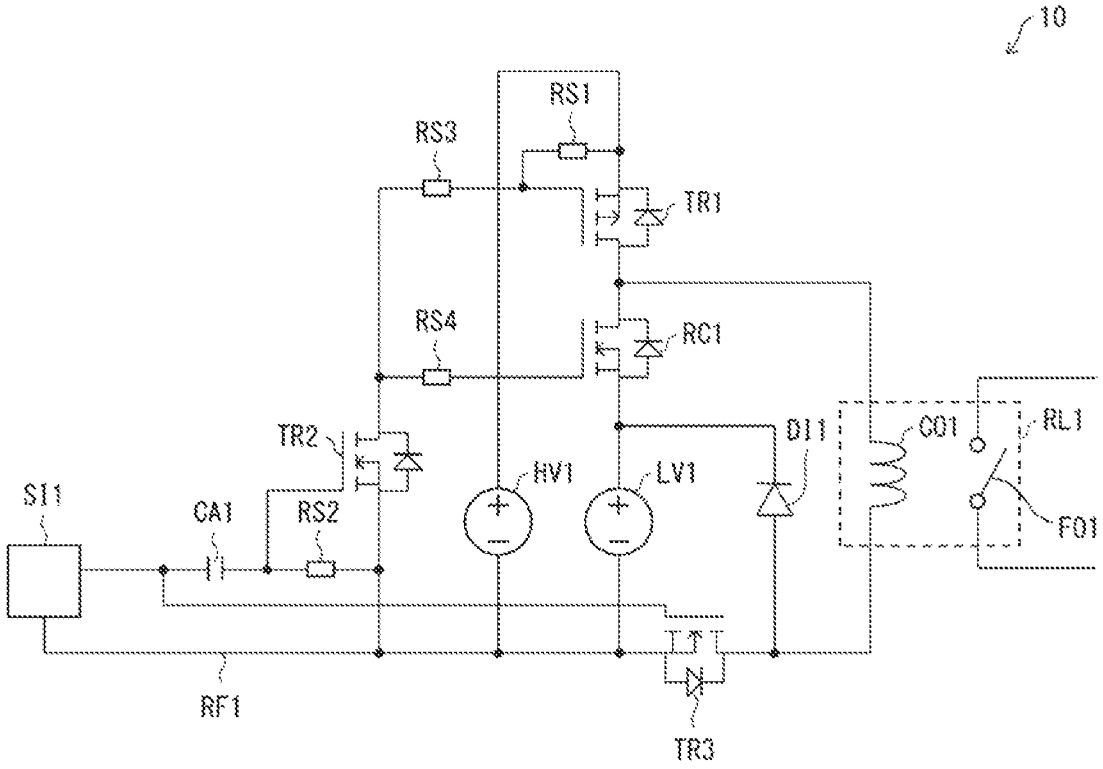
FIG. 1 is a diagram illustrating a circuit configuration of a relay control circuit according to an embodiment of the disclosure.
Figure 2:
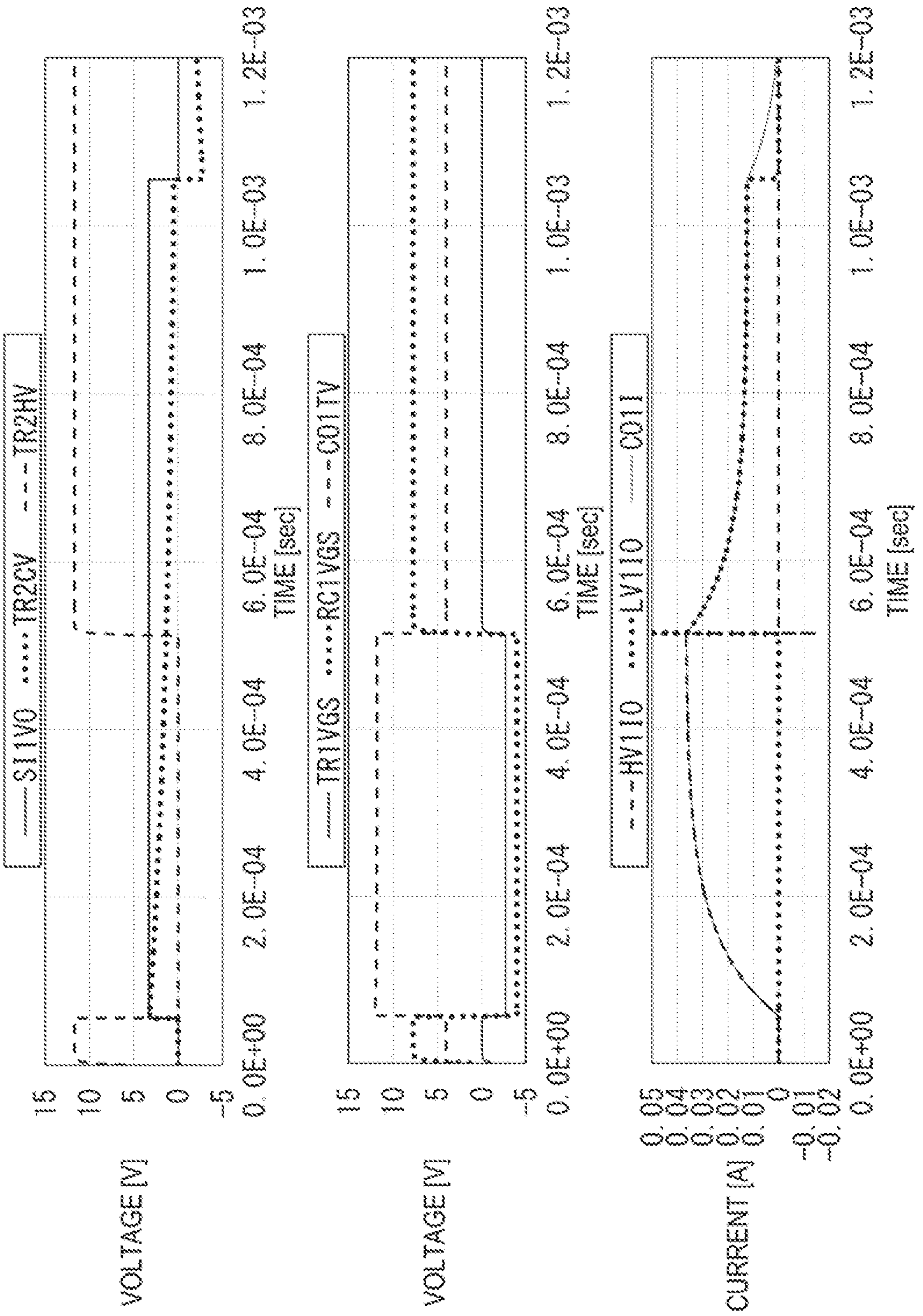
FIG. 2 is a diagram showing an operation waveform of the relay control circuit according to the embodiment of the disclosure.
Figure 3:
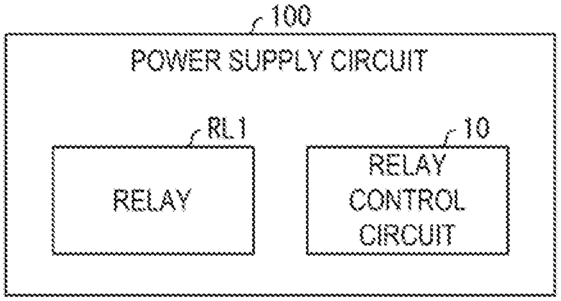
FIG. 3 is a diagram illustrating a configuration of a power supply circuit including the relay control circuit according to the embodiment of the disclosure.

FIG. 1 is a diagram illustrating a circuit configuration of a relay control circuit 10 according to an embodiment of the disclosure. FIG. 2 is a diagram showing an operation waveform of each portion of the relay control circuit 10. FIG. 3 is a diagram illustrating a configuration of a power supply circuit 100 including the relay control circuit 10.

In the disclosure, for the sake of concise description, a "high-voltage power supply HV1" is also simply referred to as "HV1", for example.

Configuration of Relay RL1

As illustrated in FIG. 1, the relay control circuit 10 is connected to the relay RL1. The relay RL1 includes a contact FO1 and a coil CO1 for operating the contact FO1. The relay control circuit 10 controls opening and closing of the contact FO1 provided in RL1 by applying a voltage across the coil CO1 provided in the relay RL1. RL1 is a non-latch relay, and FO1 is a normally open contact. Thus, it is necessary to continuously apply the voltage across CO1 in order to continue closing (pickup) of FO1. CO1 is specified to have a rated voltage of 12 V and a resistance of 320Ω.

Definitions of Terms

Prior to describing the relay control circuit 10, each term is defined in the present specification as follows.

Transistor: An element including three terminals of a high-voltage terminal, a low-voltage terminal, and a control terminal described below. The voltage or current control of the control terminal can control a state in which a current flows from the high-voltage terminal to the low-voltage terminal and a state in which the current does not flow. A metal-oxide semiconductor field effect transistor (MOSFET) and a bipolar transistor also fall under this transistor.

In a case of an N-channel metal-oxide semiconductor (NMOS), a drain is the high-voltage terminal, a source is the low-voltage terminal, and a gate is the control terminal. In a case where a voltage between the gate and the source of the NMOS is equal to a threshold voltage or greater, a current flows from the high-voltage terminal to the low-voltage terminal. In a case of a P-channel metal-oxide semiconductor (PMOS), the source is the high-voltage terminal, the drain is the low-voltage terminal, and the gate is the control terminal. In a case where the voltage between the gate and the source of the PMOS is equal to the threshold voltage or less, the current flows from the high-voltage terminal to the low-voltage terminal. In a case of PNP bipolar transistors, an emitter is the high-voltage terminal, a collector is the low-voltage terminal, and a base is the control terminal. In a case where a current flows to the control terminal of the PNP bipolar transistor, a current flows from the high-voltage terminal to the low-voltage terminal.

High-voltage terminal: Terminal used by applying a voltage higher than that of the low-voltage terminal.

Low-voltage terminal: Terminal used by applying a voltage lower than that of the high-voltage terminal.

Rectifying element: Element for causing a current to flow from an anode to a cathode represented by a diode. Here, synchronous rectifying elements represented by the NMOS and the PMOS are also included. In the case of the NMOS, the source and the drain can be defined as the anode and the cathode, respectively. In the case of PMOS, the drain and the source can be defined as the anode and the cathode, respectively.

Elements Constituting Relay Control Circuit 10

As illustrated in FIG. 1, the relay control circuit 10 according to the present embodiment includes HV1, LV1, TR1, TR2, TR3, RC1, RS1, RS2, RS3, RS4, CA1, RF1, DI1, and SI1. In more detail, the relay control circuit 10 according to the present embodiment includes the following elements.

HV1 is a high-voltage power supply having a voltage of 12 V. LV1 is a low-voltage power supply having a voltage of 4 V. In HV1 and LV1, + side is a positive electrode, and − side is a negative electrode. TR1 is a first transistor, and is the PMOS in the present embodiment. For TR1, a threshold voltage is −1.55 V, an input capacitance is 25 pF, and an on resistance is 6Ω. RC1 is a rectifying element, and is the NMOS in the present embodiment. For RC1, the threshold voltage is 1.6 V, the input capacitance is 20 pF, and the on resistance is 1Ω.

TR2 is a second transistor, and is the NMOS in the present embodiment. TR3 is a third transistor, and is the NMOS in the present embodiment. Each of TR2 and TR3 has the threshold voltage of 1.35 V, the input capacitance of 9 pF, and the on resistance of 2Ω.

DI1 is a diode having a forward voltage (VF) of 0.7 V. RS1 is a first resistor, and a resistance value is 20 kΩ. RS2 is a second resistor, and a resistance value is 510 kΩ. RS3 is a third resistor, and a resistance value is 68 kΩ. RS4 is a fourth resistor, and a resistance value is 10 kΩ. CA1 is a capacitor having electrostatic capacitance of 1 nF. SI1 is a signal generator, and outputs 0 V and 3.3 V from a signal output terminal of SI1. RF1 is a reference voltage node (0 V).

In the relay control circuit 10, RS3 and RS4 are not essential to achieve the effect of the present embodiment. RS3 and RS4 are components that can be appropriately added to the relay control circuit 10 or can be appropriately deleted from the relay control circuit 10 according to characteristics of the first transistor TR1, the second transistor TR2, the third transistor TR3, and the rectifying element RC1 included in the relay control circuit 10. If not required, direct wiring connection can be employed without using these components.

In the relay control circuit 10, DI1 is also not essential to achieve the effect of the present embodiment. Furthermore, a cathode of DI1 may be connected to one end of CO1.

Main Circuit Portion of Relay Control Circuit 10

In order to picks up FO1 of RL1, it is necessary to apply a voltage of 7 V or greater to CO1. In order to prevent dropout of FO1 and perform holding of the pickup, it is necessary to apply a voltage of 3 V or greater to CO1. In the relay control circuit 10, 12 V of HV1 is used to perform the pickup, and 4 V of LV1 is used to hold the pickup.

TR1 includes a high-voltage terminal connected to a positive electrode of HV1 and a low-voltage terminal connected to one end of CO1. RC1 includes an anode connected to a positive electrode of LV1 and a cathode of RC1 connected to one end of CO1. A negative electrode of HV1 and a negative electrode of LV1 are connected to RF1. The other end of CO1 is further connected to RF1 via TR3. In a case where TR3 is not necessary, the other end of CO1 can be connected to RF1 to operate the circuit.

The circuit operation by this connection causes TR1 to be turned ON to apply the voltage of 12 V to CO1 to perform the pickup of FO1. RC1 prevents a short circuit between HV1 and LV1 due to TR1 being turned on. Thereafter, by turning off TR1, an electromotive voltage of the CO1 causes RC1 to conduct. A voltage of 3.3 V obtained by subtracting 0.7 V of a forward voltage drop of RC1 from 4 V of LV1 is applied to CO1. Since the contact FO1 can be held with 3.3 V in this relay RL1, low loss of the relay RL1 can be performed while preventing the dropout of FO1.

Application Voltage to High-Voltage Power Supply HV1 and Low-Voltage Power Supply LV1

Relay RL1 is often affected by temperature in the installation environment. Considering the temperature dependence and variation of CO1, a voltage of HV1 is appropriately 1.2 times or more of a pickup voltage of the contact FO1 at 25° C. A lower limit of the voltage of LV1 is preferably 1.2 times or more of a dropout voltage of the contact FO1 at 25° C. Considering an influence to the loss of CO1, a voltage upper limit of LV1 is preferably four times or less of the dropout voltage of the contact FO1 at 25° C. In addition, 0.9 times or less of the voltage of HV1 is preferred. That is, the voltage of the low-voltage power supply LV1 is preferably lower than the voltage of the high-voltage power supply HV1.

ON/OFF Control Circuit of First Transistor TR1

In TR1 not connected to the reference voltage node RF1, ON/OFF switching is difficult with a signal voltage of 3.3 V/0 V. In the present embodiment, an improvement to facilitate ON/OFF switching of TR1 is incorporated into the relay control circuit 10. A high-voltage terminal of TR2 is connected to a control terminal of TR1. The low-voltage terminal of TR2 is connected to RF1. The control terminal of TR1 is connected to the positive electrode of the high-voltage power supply HV1 via RS1. Thus, in a case where the control terminal of TR1 is floating, TR1 is turned off. Whether the RS3 is applied can be selected according to the characteristics of each transistor. In these connections, in a case where TR2 is turned on, TR1 is also tuned on. in a case where TR2 is turned off, TR1 is also tuned off. The TR2 is connected to the reference voltage node RF1, and thus TR2 can be easily turned ON/OFF with 3.3 V/0 V, which are normal signal voltages.

Even in a case where TR1 is not the PMOS, TR1 similarly functions as long as TR1 is a transistor such as the PNP bipolar or the like similar to the PMOS. In a case of changing to TR1 having different characteristics, it is necessary to adjust the resistance value of RS1 and the resistance value of RS3.

Synchronous Rectification ON/OFF Control Circuit of Rectifying Element RC1

The voltage drop 0.7 V from the anode to the cathode of RC1 can be reduced to 0.01 V by performing synchronous rectification ON (ON of the NMOS). The reduction in the voltage drop allows the voltage of LV1 to be lowered, thus enabling further low loss of relay RL1. In the present embodiment, an improvement to facilitate the synchronous rectification ON/OFF switching of the RC1 not connected to the reference voltage node RF1 is incorporated for performing the synchronous rectification.

The control terminal of RC1 is connected to the positive electrode of the high-voltage power supply HV1 via RS1, RS3, and RS4. The control terminal of RC1 is further connected to the high-voltage terminal of TR2 via RS4. Whether RS3 and RS4 are applied to the relay control circuit 10 can be selected according to the characteristics of each element.

In these connections, in a case where TR2 is OFF, RC1 is turned on with the voltage of the high-voltage power supply HV1. In a case where TR2 is turned on, the voltage of the control terminal of RC1 is 0 V, which is lower than the voltage of the anode (4 V), and RC1 is turned off. The voltage of the control terminal is lower than the voltage of the anode, and thus false ON can be prevented. Thus, malfunction in which the high-voltage power supply HV1 and the low-voltage power supply LV1 are short circuited can be prevented.

Dropout Control Circuit of Contact FO1

The dropout of FO1 can be performed by lowering the voltage of LV1. In the present embodiment, a circuit facilitating the performing of the dropout is incorporated into the relay control circuit 10. TR3 is disposed between the other end of the CO1 and RF1. A high-voltage terminal of TR3 is connected to the other end of the CO1, and a low-voltage terminal of TR3 is connected to RF1. By turning off this TR3, the voltage across CO1 is suppressed, and FO1 drops out.

Circuit for Controlling Second Transistor TR2 and Third Transistor TR3 with the Same Signal)

Each of TR2 and TR3 can be controlled by a different signal, but in this embodiment, a circuit capable of being controlled with the same signal is incorporated into the relay control circuit 10. The control terminal of TR3 is connected to the signal output terminal of SI1. The control terminal of TR2 is connected to the signal output terminal of SI1 via CA1, and is connected to RF1 via RS2. The 3.3 V signal of SI1 turns on TR3 to enable voltage application to CO1, and turns on TR2 to turn on TR1. In a case where TR1 is turned on, the voltage of HV1 can be applied to CO1, and thus the pickup of FO1 can be performed. Since the control terminal of TR2 is connected to RF1 via RS2, TR2 is turned off after a lapse of time. In a case where TR2 is turned off, TR1 is turned off and the synchronous rectification of RC1 is turned on. Thus, a series of control from the pickup of FO1 to the contact holding with low loss can be performed by the single signal of SI1.

Operation Waveform of Relay Control Circuit

The operation waveform of the relay control circuit 10 illustrated in FIG. 1 will be described below with reference to three graphs shown in FIG. 2. Each line of these graphs describes the following items.

SI1VO: Voltage of the output terminal of SI1

TR2CV: Voltage of the control terminal of TR2

TR2HV: Voltage of the high-voltage terminal of TR2

TR1VGS: Control terminal voltage with respect to the high-voltage terminal of TR1

RC1VGS: Control terminal voltage with respect to the low-voltage terminal of RC1

CO1TV: Voltage of one end of CO1

HV1IO: Output current of HV1

LV1IO: Output current of LV1

CO1I: Current of CO1

First Step: Output 3.3 V of the Signal Generator SI1 Turns on TR3 and TR1, and Turns Off RC1

By setting SI1VO to 3.3 V, the control terminal of TR3 exceeds the threshold voltage. Thus, TR3 is turned on, and a voltage can be applied to the coil CO1. At the same time as TR3 is turned on, TR2CV exceeds the threshold voltage, and TR2HV is reduced to 0 V. TR2HV simultaneously affects TR1VGS and RC1VGS connected to TR2. TR1VGS is −3 V, and TR1 is turned ON. RC1VGS is −4 V, and RC1 is turned off (OFF of the synchronous rectification). As illustrated in CO1TV, the voltage of HV1 is applied to CO1. As a result, CO1IO increases and FO1 is picked up.

Second Step: OFF of TR1 and ON of RC1 Due to TR2CV Reduction after a Lapse of Time TR2CV is below the threshold voltage after the lapse of time, and is turned off. Thus, TR1VGS is 0 V, and TR1 is turned off. RC1VGS is 8 V, and RC1 is turned on (ON of the synchronous rectification). As a result, CO1TV is switched to the voltage of LV1, and the pickup of the contact FO1 is held with low loss.

Third Step: Drops Out Contact FO1 with Output 0 V of Signal Generator SI1

TR3 is switched to OFF by setting SI1VO to 0 V. As a result, the other end of CO1 is clamped to 4 V by the conduction of DI1. Thus, the voltage across CO1 drops, and FO1 drops out.

Power Supply Circuit 100 Provided with Relay Control Circuit 10

As illustrated in FIG. 3, the power supply circuit 100 includes the relay RL1 and the relay control circuit 10. In other words, the relay control circuit 10 constitutes the power supply circuit 100 together with RL1. In the power supply circuit 100, RL1 is used as a power supply input changeover switch. By using the relay control circuit 10, low loss of RL1 can be performed. Thus, loss in the power supply circuit 100 can be reduced.

FormA, which is a normally open is applied to FO1 of RL1. The relay control circuit 10 is also applicable to FormB and FormC according to the application, without being limited to FormA. Note that each numerical value described above is merely an example. In order to adjust the circuit operation, addition of resistors to the wiring lines or addition of capacitors between the wiring lines can be performed as appropriate.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A relay control circuit configured to control opening and closing of a contact of a non-latch relay, the non-latch relay including the contact and a coil configured to operate the contact, the relay control circuit comprising:

a low-voltage power supply;

a high-voltage power supply;

a first transistor;

a second transistor;

a rectifying element; and a reference voltage node, wherein a high-voltage terminal of the first transistor is connected to a positive electrode of the high-voltage power supply, a low-voltage terminal of the first transistor is connected to one end of the coil, an anode of the rectifying element is connected to a positive electrode of the low-voltage power supply, a cathode of the rectifying element is connected to the one end of the coil, a negative electrode of the high-voltage power supply, a negative electrode of the low-voltage power supply, and another end of the coil are connected to the reference voltage node, a low-voltage terminal of the second transistor is connected to the reference voltage node, a high-voltage terminal of the second transistor is connected to a control terminal of the first transistor, the control terminal of the first transistor is connected to the positive electrode of the high-voltage power supply via a first resistor, in a case that the second transistor is turned on, the first transistor is also turned on, and in a case that the second transistor is turned off, the first transistor is also turned off, the rectifying element is an N-channel metal-oxide semiconductor (NMOS), and a control terminal of the NMOS is connected to the high-voltage terminal of the second transistor, such that a voltage of the control terminal of the NMOS is lower than a voltage of an anode of the NMOS by an amount of voltage that is equal to a voltage of the low-voltage power supply in a case that the second transistor is turned on.

2. The relay control circuit according to claim 1, further comprising:

a signal generator that is capable of outputting OV when a voltage of the high-voltage power supply or the voltage of the low-voltage power supply are applied; and a third transistor disposed between the another end of the coil and the reference voltage node, wherein a high-voltage terminal of the third transistor is connected to the another end of the coil, a low-voltage terminal of the third transistor is connected to the reference voltage node, a control terminal of the third transistor is connected to a signal output terminal of the signal generator, a control terminal of the second transistor is connected to the signal output terminal of the signal generator via a capacitor and is connected to the reference voltage node via a second resistor, and the contact is predisposed to be dropping out when the voltage of the high-voltage power supply or the voltage of the low-voltage power supply is applied.

3. A power supply circuit comprising:

the relay control circuit according to claim 1.

* * * * *